No. 837,821. PATENTED DEC. 4, 1906.
E. FOURCAULT.
APPARATUS FOR DRAWING CONTINUOUS SHEETS OF GLASS.
APPLICATION FILED MAY 21, 1906.

4 SHEETS—SHEET 1.

No. 837,821. PATENTED DEC. 4, 1906.
E. FOURCAULT.
APPARATUS FOR DRAWING CONTINUOUS SHEETS OF GLASS.
APPLICATION FILED MAY 21, 1906.

4 SHEETS—SHEET 2.

Witnesses:
Inventor
Emile Fourcault
By James L. Norris
Atty

No. 837,821. PATENTED DEC. 4, 1906.
E. FOURCAULT.
APPARATUS FOR DRAWING CONTINUOUS SHEETS OF GLASS.
APPLICATION FILED MAY 21, 1906.
4 SHEETS—SHEET 3.
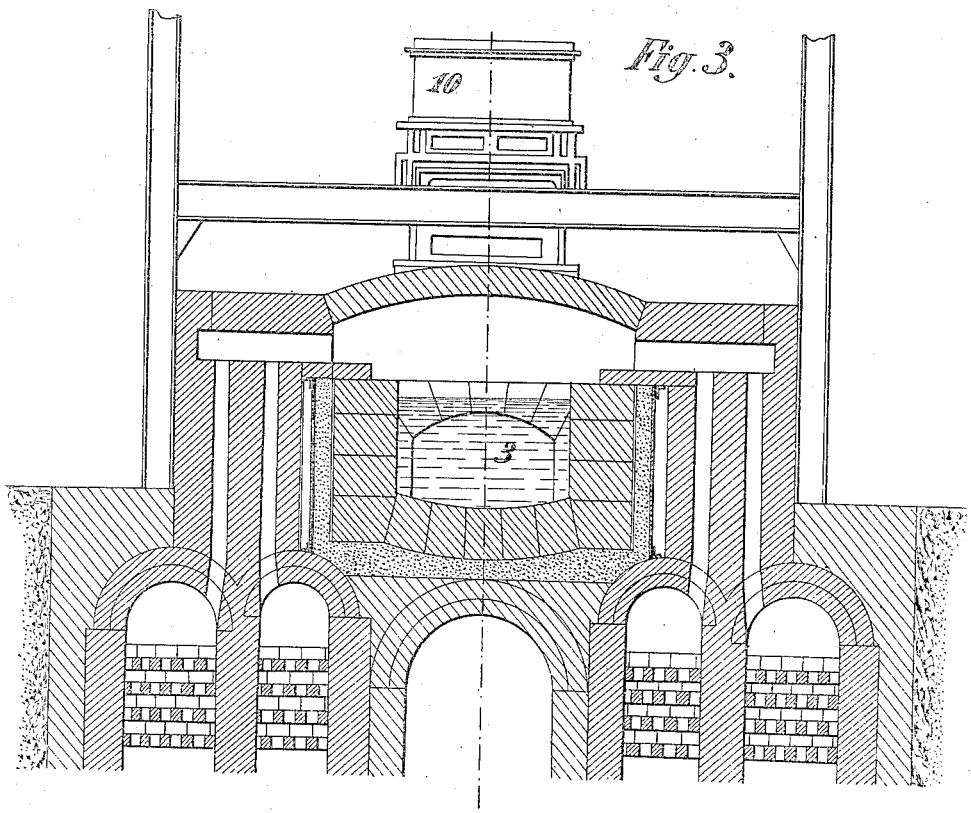

No. 837,821. PATENTED DEC. 4, 1906.
E. FOURCAULT.
APPARATUS FOR DRAWING CONTINUOUS SHEETS OF GLASS.
APPLICATION FILED MAY 21, 1906.
4 SHEETS—SHEET 4.
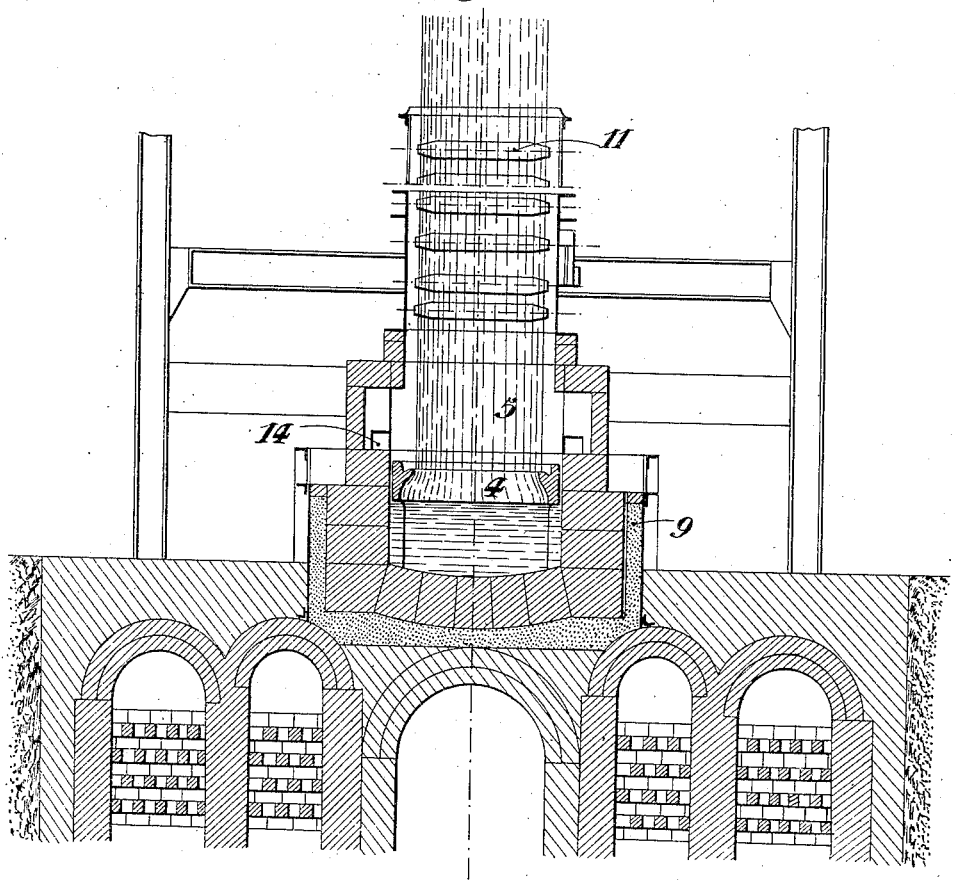

UNITED STATES PATENT OFFICE.

EMILE FOURCAULT, OF LODELINSART, BELGIUM.

APPARATUS FOR DRAWING CONTINUOUS SHEETS OF GLASS.

No. 837,821.      Specification of Letters Patent.      Patented Dec. 4, 1906.

Application filed May 21, 1906. Serial No. 318,042.

*To all whom it may concern:*

Be it known that I, EMILE FOURCAULT, glass manufacturer, a subject of the King of Belgium, residing at Lodelinsart, Belgium, have invented certain new and useful Improvements in Apparatus for Drawing Continuous Sheets of Glass, of which the following is a specification.

This invention relates to glass-drawing apparatus for disposition on a glass-melting oven to facilitate drawing a number of continuous sheets of glass.

In apparatus hitherto known the glass is drawn from a bath of molten glass communicating directly with the hearth of the glass-oven, and in this apparatus the bath of molten glass has not the same temperature on the two sides of the drawn sheet, for the reason that the one side of the sheet of glass opposite to the point of communication between the hearth and the bath is subjected to the radiation heat of the hearth, and thus the heat is unequally distributed and the glass drawn presents variations in its consistency. In other apparatus the glass has been drawn from an independent tank, requiring a decantation of the molten glass from the furnace to the said tank, and which operation has been found to be very prejudicial to the homogeneousness and pureness of the molten glass to be drawn. This method of drawing glass from an independent tank cannot be continuously carried on, or, in other words, a continuous sheet of glass cannot be drawn from the tank in view of the variations of level of the molten glass in the tank due to an intermittent feed and also for the reason that the tank is frequently emptied or has the glass lowered to such a level therein as to render the glass to be drawn too stiff for practical purposes.

The present invention has for its object a novel disposition of drawing apparatus in combination with the melting-oven to avoid the disadvantage hereinbefore noted and permit a number of similar apparatuses to be mounted on the same melting-oven and to be fed by the same bath of molten glass, the bath of glass remaining constantly at the same level.

Figure 1:
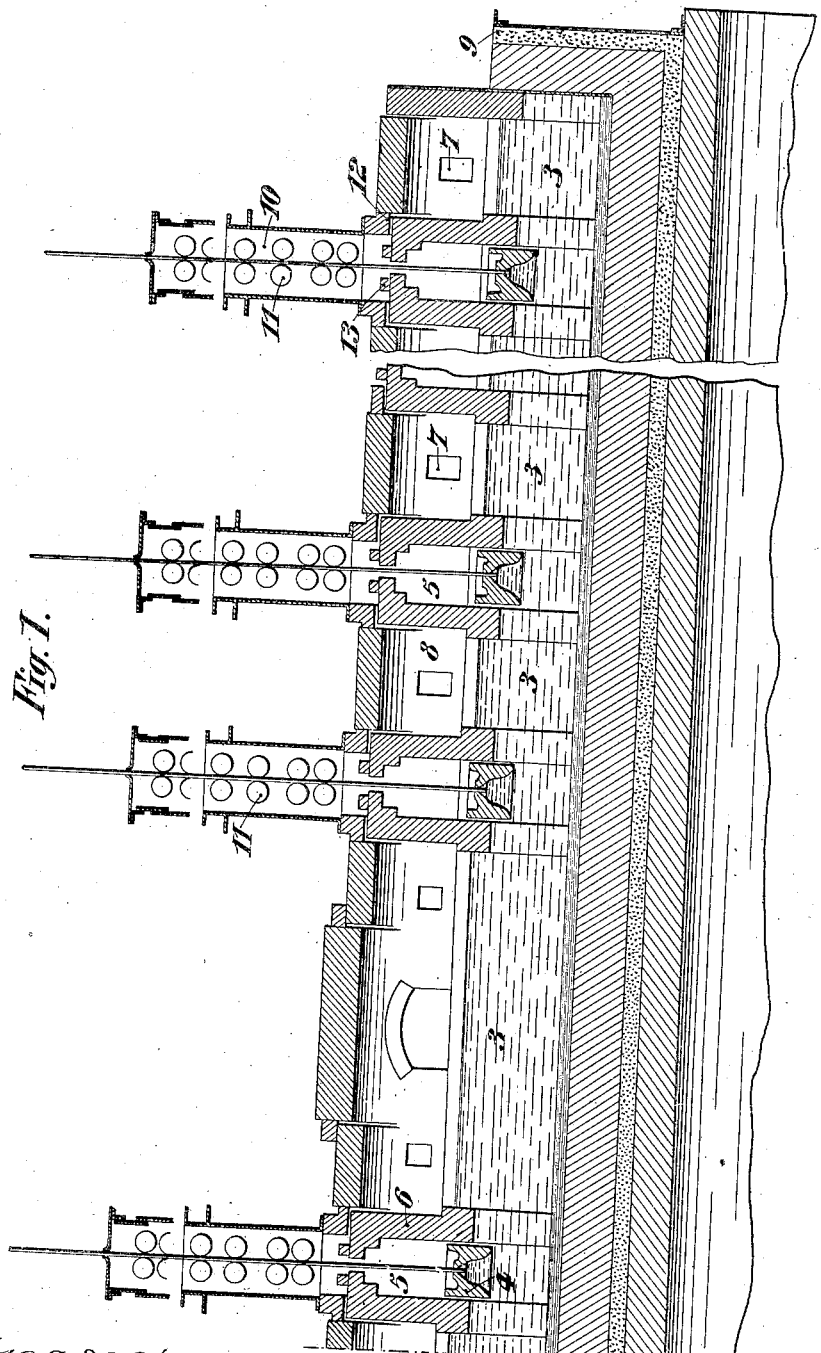
Figure 2:
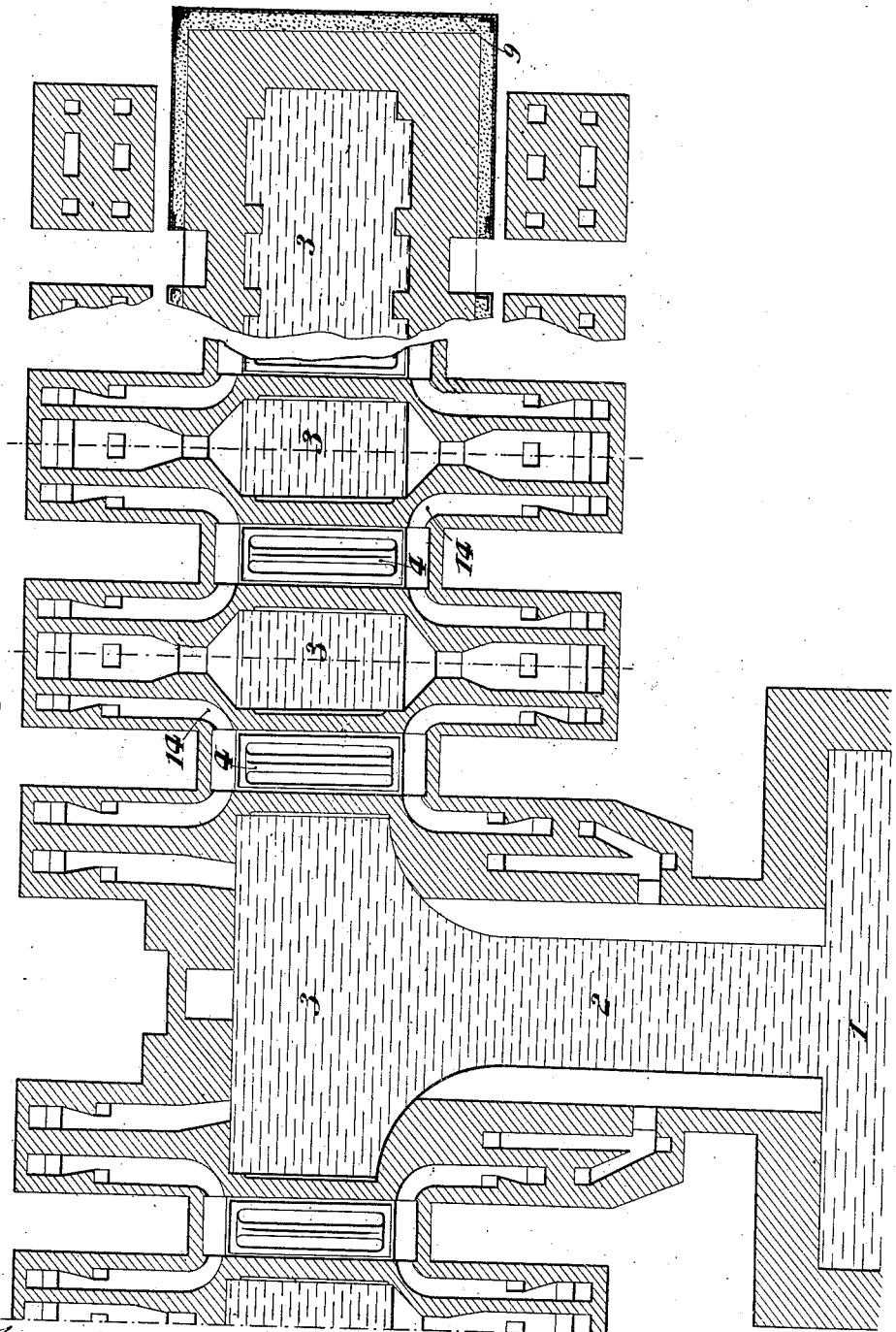

In the accompanying drawings, Figure 1 is a longitudinal section of the apparatus embodying the features of the invention and taken through the center of the conduit for feeding the molten glass and forming the sole means of supply for the drawing apparatus. Fig. 2 is a horizontal section of the same. Fig. 3 is a transverse section taken through a chamber for reheating the molten glass. Fig. 4 is a transverse vertical section through the drawing apparatus.

The glass is melted in an ordinary oven 1 and passes from the oven in a pure, well-refined, and homogeneous condition through a conduit 2 into a second or supply conduit 3, on which the drawing apparatus is disposed. The conduit 3 is divided into compartments constituting alternately a drawing-chamber 5 and a reheating-chamber 8. The reheating-chambers are provided with arches at a proper level with respect to the molten glass filling the conduit 3 and are provided with vertical walls projecting slightly above the upper portion of the said conduit and having such thickness as to render them practicable to perform their intended functions. The compartments 5 are open and the compartments 8 closed at their upper extremities. The portions of these compartments which are above the level of the molten glass are absolutely independent of each other; but the molten glass can freely pass at a certain depth from one compartment into the other beneath the arches.

The heat of the reheating-chambers 8 can only pass between the upper portions 6 of the vertical walls of the drawing-chambers. The upper portions 6 of the walls of the drawing-chambers are heated externally by flames produced in burners 7. As will be seen from the drawings, between two reheating-chambers 8 a drawing-chamber 5 is disposed, and under such conditions the heat from the reheating-compartments 8 passes through the upper portions 6 of the walls of the said drawing-chambers and maintains in these latter chambers a constant temperature which can be easily regulated.

The required amount of heat passing in the drawing-chambers is regulated by the thickness given to the upper portions 6 of the walls of said chambers, as the amount of caloric passing through the walls is in an inverse ratio to the thickness of these walls. The increased heat produced by the burners 7 will not greatly or materially modify the temperature of the chambers 5, in view of the interposed upper portions 6 of the walls of said heating-chambers, and hence the glass does not become too fluid to be drawn, but is maintained at a proper consistency. Furthermore, in view of the fact that it is only necessary to maintain the glass at a drawing consistency the burners 7 will not be required to give out an intense heat, and a small amount of fuel only will be required to keep the burners in proper condition for heating the upper portions 6 of the vertical walls of the chambers 5, and this is particularly true in view of the fact that the chambers 5 are protected against external radiation and cooling by a coating 9 of sand or of other bad heat-conducting substance, this prevention of surface radiation also operating to overcome any tendency to devitrification of the glass in the conduit 3.

On each drawing-chamber 5, in which the sheets of glass are formed and slowly cooled, the drawing and annealing apparatus 10 and 11 are mounted, such apparatus being of a known construction.

The operation of the apparatus is as follows: The molten glass passes from the hearth 1 through the conduit 2 into the conduit 3 and in the latter is maintained at the required temperature by means of the heat from the burners 7. The molten glass is thus fed to the drawing apparatus in a constantly homogeneous state. Floats or blocks 4 are provided at the lower part of each apparatus, and through the vertical slot of each the glass is drawn, the block or float coöperating with each drawing-chamber dipping deeply into the glass in order to take and feed the glass to be drawn from the lower part of the conduit 3, in view of the fact that the glass in the lower portion of said latter conduit is thicker than the upper portion of the molten glass, and it is therefore in better condition for drawing. Each sheet of glass is formed without difficulty and is drawn continuously through and upwardly from the slot of the float 4 and congeals gradually between the walls of the drawing-chamber 5. The drawn sheets of glass are caught by the rollers 11 when they are sufficiently solidified and cooled and are therefore not injured by the rollers, and as these rollers are mounted in annealing-casings 10 the glass is regularly annealed as it is operated upon by the rollers. The finished sheet of glass is fed out continuously at the top of the annealing-casing, where it is cut with a diamond in desired lengths and made ready for use.

It is necessary, particularly in starting the apparatus, to regulate the temperature in the annealing-casings. For this purpose the lower part of each casing is provided with small conduits 12, which may be closed by means of bricks 13. These conduits 12 permit the heat to pass from the chambers 8 into the casings 10, and thus the latter can be heated from the same source of heat as the chambers 5. By this means a regularity of temperature is obtained in the drawing apparatus. The drawing-chambers 5 can also be heated by means of burners 14, (see Fig. 4,) disposed at each corner of the said chambers. These burners, however, do not work continuously and are used only for heating the chambers 5 and blocks 4 when the latter parts are too cold after cessation of the operation.

Having thus described the invention, what is claimed as new is—

1. In an apparatus for drawing continuous sheets of glass, the combination of a melting-oven having a hearth, a conduit connected to the hearth, a second conduit divided into chambers and communicating with the first conduit, said chambers alternately forming drawing-chambers and reheating-chambers, arches carrying walls separating these chambers and permitting the molten glass to pass from one chamber to the other at the lower part beneath the same, and burners in the reheating-chambers for maintaining the required temperature in the apparatus.

2. In an apparatus for drawing continuous sheets of glass, the combination of a melting-oven having a hearth, a conduit connected to the hearth, a second conduit divided into chambers and communicating with the first conduit, said chambers alternately forming drawing-chambers and reheating-chambers, arches carrying walls separating these chambers and permitting the molten glass to pass from one chamber to the other at the lower part beneath the same, burners in the reheating-chambers for maintaining the required temperature in the apparatus, and supplemental burners coöperating with the drawing-chambers for starting the apparatus.

3. In an apparatus of the class set forth, the combination of a melting-oven having a hearth with a conduit connected thereto, a second conduit communicating with the first conduit and divided into chambers to alternately form drawing and reheating chambers, a block or float with a slot therethrough disposed in each drawing-chamber, each drawing-chamber having an opening at the top, an annealing-casing mounted above each drawing-chamber, rollers in the annealing-casing for drawing the glass, heating means for each drawing-chamber, and conduits having closing means and establishing communication between the heating means for the drawing-chambers and the annealing-casing.

4. In an apparatus of the character set forth, a melting-oven having a hearth with a conduit connected to the latter, a second conduit communicating with the first conduit and divided into chambers to alternately provide drawing and reheating chambers, heating means for the drawing-chambers, and an exterior covering of heating non-conducting material applied to said heating means.

5. In an apparatus of the character set forth, a melting-oven having a hearth with a conduit connected to the latter, a second conduit communicating with the first conduit and divided into chambers to alternately provide drawing and reheating chambers, and heating means for the drawing-chambers.

In testimony whereof I have hereunto set my hand in presence of two subscribing witnesses.

EMILE FOURCAULT.

Witnesses:
ORTHUR REGNIERS,
LÉOPOLD BASTIN.